INVENTORS
HARTMAN MITCHELL &
ALEXANDER T. DORTENZO
their Attorney

Oct. 17, 1967  H. MITCHELL ET AL  3,347,539
EXHAUST RECEIVING HOOD
Filed Oct. 23, 1964  3 Sheets-Sheet 2

INVENTORS
HARTMAN MITCHELL &
ALEXANDER T. DORTENZO
BY
their Attorney

INVENTORS
HARTMAN MITCHELL &
ALEXANDER T. DORTENZO
BY
their Attorney

United States Patent Office 3,347,539
Patented Oct. 17, 1967

3,347,539
EXHAUST RECEIVING HOOD
Hartman Mitchell and Alexander T. Dortenzo, Pittsburgh, Pa., assignors to Koppers Company, Inc., a corporation of Delaware
Filed Oct. 23, 1964, Ser. No. 406,114
7 Claims. (Cl. 266—35)

ABSTRACT OF THE DISCLOSURE

An exhaust hood for a BOF converter is comprised of a tubular frame with water cooled panels arranged in groups that are supported by the frame. The groups of panels are arranged within the frame to provide an effluent conduit, and the water cooled panels are disposed in lower, intermediary, and upper tiers, with fluid conduits connecting the tubular frame to the panels of each group so that cooling water circulating in the frame also circulates in the panels and cools them.

The hood is mounted on wheels so that the hood may be positioned over BOF converters when being used and retracted when not being used.

---

This invention relates to basic oxygen furnaces and, more particularly, to an exhaust receiving apparatus or hood for receiving the hot effluent discharge from a basic oxygen furnace.

The exhaust receiving device or hood for the basic oxygen furnace, as presently constructed, first receives and then conducts the hot effluent gases away from the furnace region to other apparatus which cleans and treats the gases. Great quantities of effluent such as gases, fumes, and dust, are produced by the reaction of the oxygen and the hot metal, and the temperature of the effluent discharge may reach 3,500° F. or even higher temperatures. The blowing time is usually from 20-22 minutes and the quantity of hot effluent discharged in that period of time is tremendous; being in the order of 175,000 cu. ft./min. or more. Because the effluent may have a temperature of 3,500° F., or higher temperature, it is necessary to provide some means to cool the hood structure.

Heretofore, hoods have been proposed which have utilized a water jacket, and a cooling fluid, such as water, has been circulated in the water jacket passages. Other types of hoods have utilized a plurality of adjacent fluid carrying tubes arranged in much the same fashion as the tubes comprising a steam generator water wall. In such instances, however, the weight of the hood, and the fact that there is no simple and effective way to make repairs whenever a leak occurs, have been serious problems. For these and other reasons, such hoods have not been entirely satisfactory.

Because the basic oxygen furnace is usually tilted out of vertical, in order to charge it with scrap and other ingredients, it is essential that the exhaust receiving apparatus or hood be readily and easily movable, with respect to the furnace, so as not to interfere with use of the furnace during the charging and teeming operations.

In the present invention, a metallurgical furnace hood comprises spaced apart upper and lower octagonal shaped tubular frame units, which constitute the support for the hood proper. The hood itself comprises a plurality of such panel sections adjacently arranged and secured to the tubular support structure to form a polygon which approaches a circular cross section. Each panel section includes a plurality of rectangular tubular members which are disposed in side abutting relation. The hood and support structure are conveniently mounted on wheels for lateral movement toward and away from the basic oxygen furnace.

For a further understanding of the present invention and for other advantages and features thereof, reference may be made to the following description taken in conjunction with the accompanying drawings forming a part of this application, in which.

Figure 1:
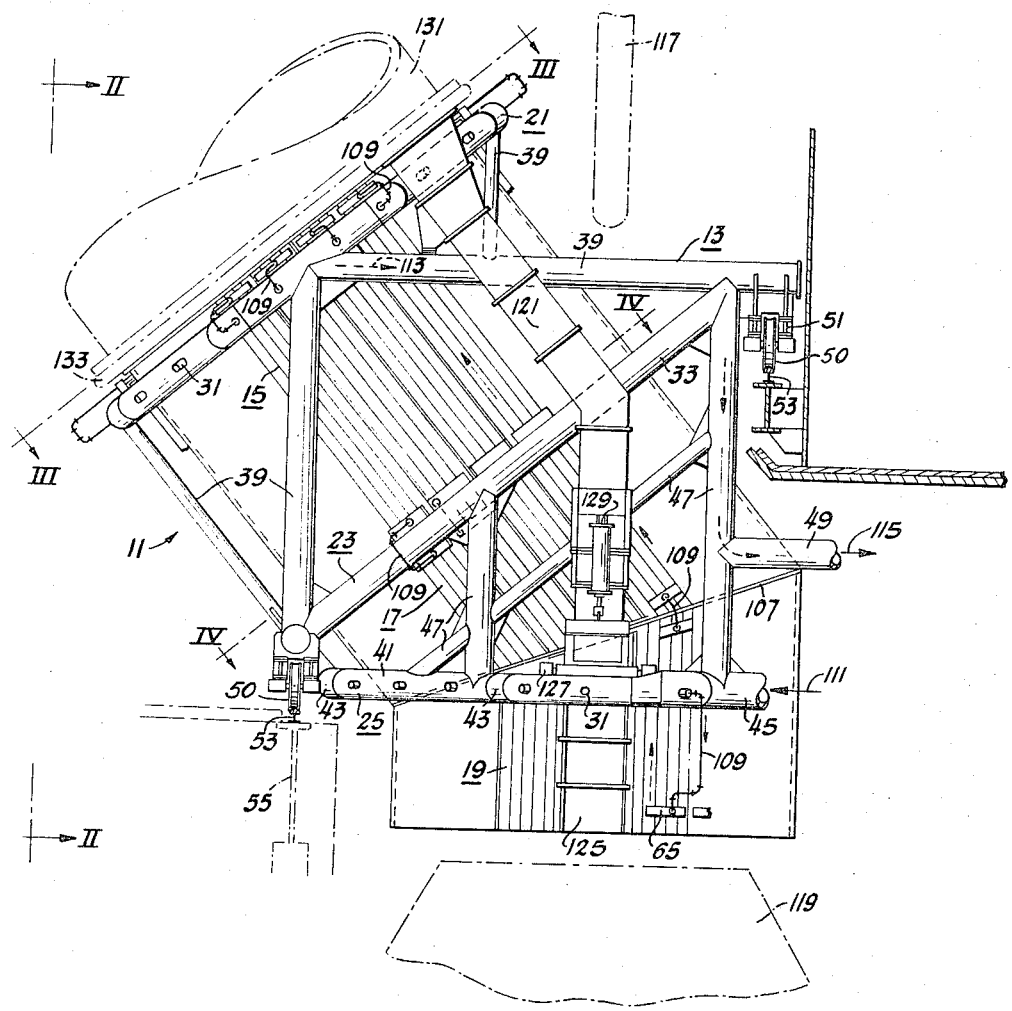
FIG. 1 is a schematic side elevational view of an embodiment of an exhaust receiving hood of the present invention for a metallurgical type furnace.

In the drawings, FIG. 1 illustrates an exhaust receiving hood, designated generally as 11. A tubular supporting structure 13, and a plurality of adjacent water cooled panel sections arranged and disposed as tiers, 15, 17, 19, form the effluent conduit portion of the hood 11.

The supporting structure 13 includes spaced apart upper, intermediary, and lower octagonal shaped members 21, 23, 25, respectively. Each of the octagonal shaped members 21, 23, 25, is supported and maintained in fixed spaced apart relation to the respective other octagonal members by a plurality of tubular members, such as the members 39, 47, disposed vertically, diagonally, and horizontally, as shown in the drawings.

Figure 3:
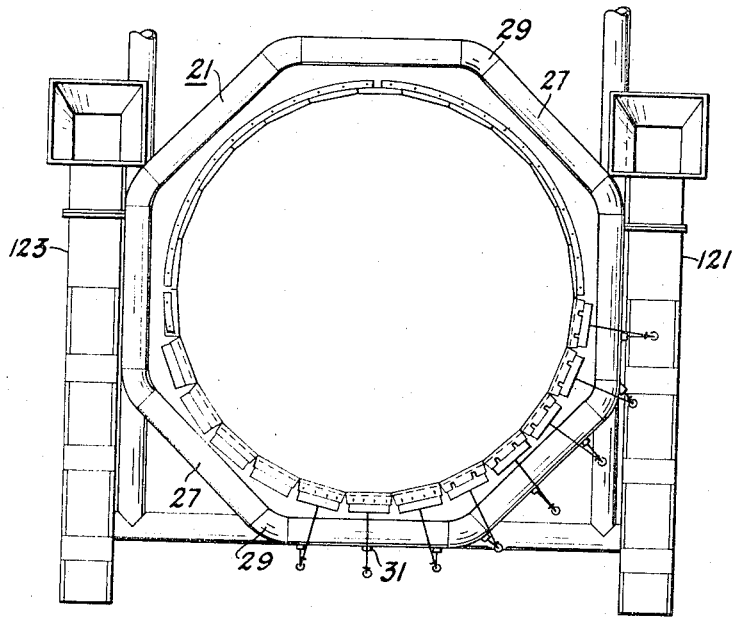
FIG. 3 is a view along line III—III of FIG. 1.

The upper octagonal shaped member 21 is best shown in FIG. 3. It includes eight lengths of pipe 27, which form the eight sides of the octagon shaped member, and which are connected together at their extremities by 45° elbow fittings 29. The upper octagonal shaped member 21 is also provided with a plurality of tubular pipe couplings 31, which are conveniently welded to the outer periphery of the pipe members 27 and the elbows 29, about where shown in FIG. 3, and which communicate with the interior of the tubular member for a purpose to be described hereinafter. It will be understood from FIG. 3, that only a representative member of pipe couplings 31 are shown, and that at least one such pipe coupling is provided for each water cooled panel which are described hereinafter.

Figure 2:
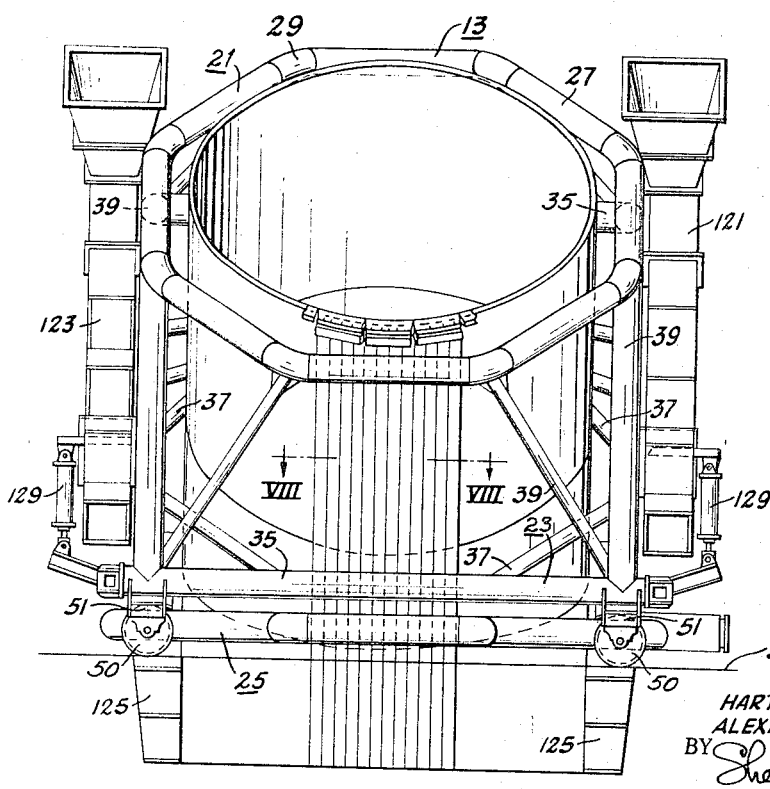
FIG. 2 is a view along line II—II of FIG. 1.

The intermediary octagonal shaped member 23 includes two spaced apart, parallel main pipe conduit members 33 (see FIG. 1) which are connected to two other spaced apart parallel conduit members 35. The conduit members 35 are disposed at substantially right angles to the conduit members 33 and are located adjacent the ends of the conduit members 33, as shown in FIG. 2. Between the conduit members 33 and 35, there are a plurality of diagonally disposed other tubular members 37 so as to form the intermediary octagonal shaped member 23. As may be noticed by referring to FIG. 1, the upper and intermediary octagonal members 21, 23 are interconnected and maintained in spaced apart relation by a plurality of other tubular members 39 disposed vertically, diagonally, and horizontally. Because not all of the intermediary tubular members 39 function in the same manner, it is convenient to provide vertical, diagonal, and horizontal tubular members of different sizes.

The lower octagonal member 25 is also made up of lengths of pipe 41, which are connected together at their extremities by elbow fittings 43, to form another octagonal shaped fluid conduit. As shown in FIG. 1, it is convenient to provide one pipe conduit 41 of a larger size in the region adjacent a main fluid inlet conduit 45. This larger conduit will have a larger internal volume and there will be less restriction to the incoming fluid in this particular region. The lower octagonal shaped fluid conduit 25 is also structurally connected to the upper and intermediary octagonal members 21, 23, by means of tubular members 47 disposed vertically, diagonally, and horizontally.

It will be noticed by referring to FIG. 1, that a fluid outlet conduit 49 is located in one of the vertical tubular members at the right hand side of the structure. The lower octagonal shaped fluid conduit 25 is also provided with a plurality of the tubular pipe couplings 31, and they are similarly welded to the outer periphery of the tubular members 41 and the elbow 43, as described previously. It is to be noted, that the intermediary octagonal shaped member does not carry cooling fluid, and so it has no pipe couplings 31 on its outer periphery.

Referring to FIG. 1, the entire hood support structure 13 is mounted on wheels 50, which are suitably journaled in bearings that are fastened to wheel brackets 51 that are fixed to the tubular conduit members at the lower left and upper right region of the structure. The wheels 50 engage and roll upon conventional rails 53 fixed to the usual surface floor steel work 55, or other suitable supporting structure.

Figure 4:
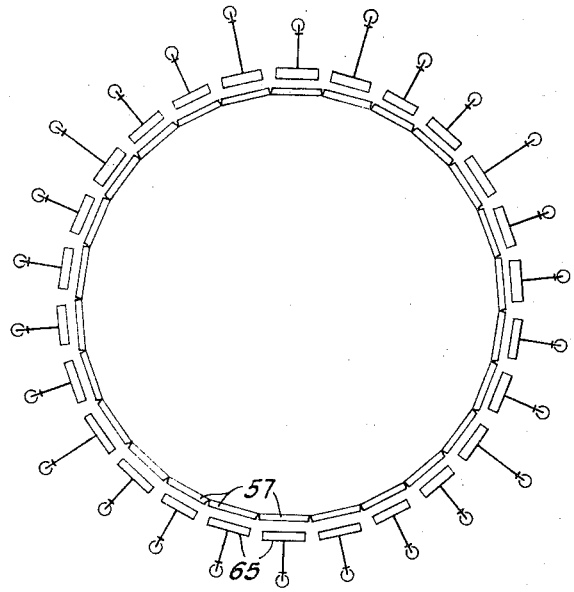
FIG. 4 is a sectional view along line IV—IV of FIG. 1.

FIG. 4 illustrates a typical transverse cross section of the effluent conduit portion of the hood 11. The cross sectional shape of the hood is a polygon, which, in the embodiment shown, has twenty-six sides. The number of sides, of course, may vary in other applications and instances as preferred. Each of the twenty-six sides of the polygon is a water cooled panel. A typical panel 57 is constructed in the manner shown in FIGS. 5 and 6.

Figure 7:
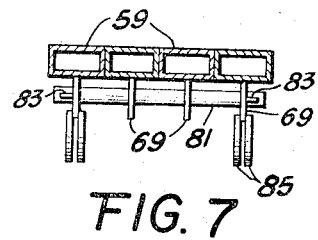
FIG. 7 is a sectional view along line VII—VII of FIG. 5.

Each panel 57 includes four lengths of rectangular tubing 59. In a preferred embodiment of the invention, the tubing is seamless steel tubing having cross sectional dimensions of 6 in. x 2 in., with a ⅜ in. wall thickness. The four lengths of rectangular tubing are arranged in adjacent side abutting relation as shown in FIG. 7. The upper ends of the tubular members 59 are closed by individual rectangular plate members 61, which are welded to the respective tubes, while the bottom ends of the tubular members are closed by other plates (not shown), which are also welded to each individual tube. It will be appreciated by those skilled in the art that the ends of the rectangular tubes may be closed in any other appropriate manner.

From FIG. 1, it will be noted that the panels in the upper tier 15 are generally rectangular, but that the panels in the intermediary and lower tiers 17, 19, are generally trapezoidal, due to the offset configuration of the hood 11. Thus, the length and shape of each tubular member will depend upon its respective location in the hood. However, each tubular panel is constructed in the general manner described hereinafter.

Figures 5, 6:
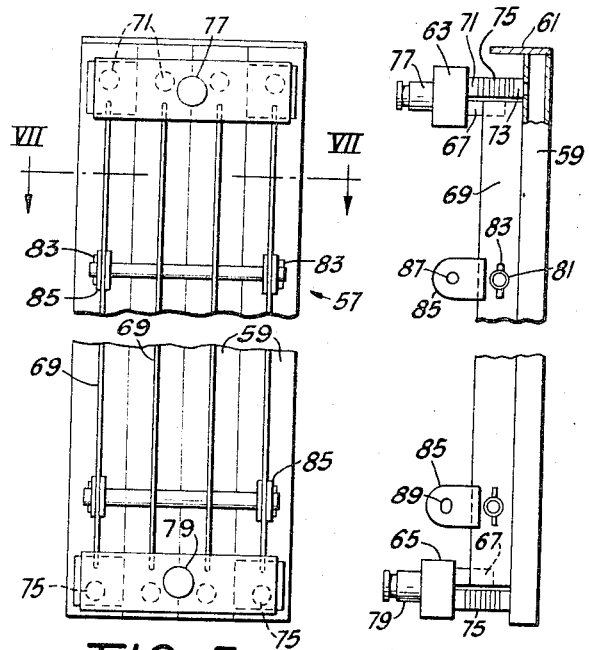
FIG. 5 is an elevational view of a typical hood panel.
FIG. 6 is a side elevational view of the panel of FIG. 5.

Referring to FIGS. 5 and 6, it will be noticed that each panel is provided with upper and lower rectangular tubular headers 63, 65. In a preferred embodiment of the invention, these headers have cross sectional dimensions of 6 in. x 4 in., with a ⅜ in. wall thickness. The ends of these tubular headers 63, 65 are also appropriately closed with cap plates welded thereto. The headers are disposed in spaced apart relation to the tubular members 59 by outstanding clip members 67, which are welded to vertical rib members 69. The vertical rib members are fastened in spaced apart relation to the tubular members 59 by welding or in any other appropriate manner.

Each header is provided with four nipple-like adapters 71, and a corresponding matching nipple-like adapter 73 is provided on each tubular member. As may be noticed by referring to FIG. 6, a length of flexible metallic hose 75 connects each adjacent pair of adapters 71, 73. Other adapter fittings 77, 79 are provided on each tubular header 63, 65, for the purpose of conducting cooling fluid into and out of the panel in the manner described hereinafter.

The four tubular members 59, comprising the panel 57, are held and maintained in side-abutting relation by means of a pair of horizontally disposed tubes 81, which extend through axial apertures in the several ribs 69. A wedge-like key member 83, or other similar locking member, may be inserted in a slot in each end of each tube 81. If desirable, the keys 83 may be kept and maintained in place by means of cotter pins (not shown), bolts or other appropriate means. On the outer vertical ribs 69, adjacent each tube 81, there is provided upper and lower pairs of clips 85. In the upper set of clips 85, there is a circular hole 87, while in the lower set of clips there is a vertically elongated hole 89. The purpose of the vertically elongated hole 89, will be explained hereinafter.

Figure 9:
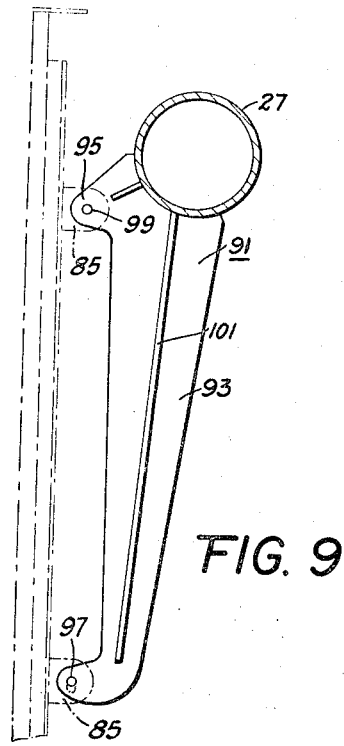
FIG. 9 is an elevational view of a typical panel support hanger.

Each panel 57 is supported in relation to one of the octagonal shaped support members by means of panel hangers 91, such as is shown generally in FIG. 9. The panel hanger 91 includes a vertical plate 93 which is provided on one edge with spaced apart ears 95, 97 in which there are holes 99, that correspond with the holes 87, 89 in the clips 85. When the panel is installed adjacent a respective panel hanger, the vertical plate 93 and, in particular, the ears 95, 97, fit between each pair of clips 85, and a suitable pin or other fastener may be inserted in the holes 87, 95, and 89, 97, to hold and maintain the panel in position. The elongated holes 89 allow for expansion of the panel and hanger when the hood becomes hot during operation. It will be noticed also that the plate 93 is shaped to fit the outer periphery of the tubular member 27, for example, and is fixed thereto by welding. Additional side stiffeners 101, 103 may be welded to the plate 93 and to the tubular member 27 as shown in FIG. 9, for the purpose of providing lateral rigidity to the panel hanger 91.

Figure 8:
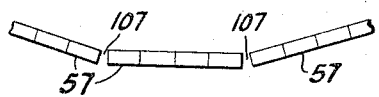
FIG. 8 is a sectional view along line VIII—VIII of FIG. 2.

The hood 11 may be readily assembled by connecting the several panels to their respective hangers and connecting flexible metallic hoses to their adapters, and to the respective nipples 31 on the support structure 13. It will be noticed from FIG. 8, that when the hood is cold, there is a space 107 provided between adjacent panels. In the embodiment shown in the drawings, this space 107 is about ⅜ in. wide. A similar space is likewise provided between the panels in the upper and intermediary tiers, 15, 17, and the intermediary and lower tiers 17, 19. The space between the upper and intermediary tiers, while not shown in the drawings, occurs at the level of the intermediary octagonal shaped support structure 23.

When the panels have been assembled and after they are connected to their respective hangers, metallic hoses 109 may then be connected to the nipple-like adapters 77 of each panel header and to the pipe couplings 31 on the lower and upper octagonal shaped support members. An additional length of metallic hose 109 connects each of the adjacent adapters 79, 77 on the headers of the upper and intermediary tiers, and the lower and intermediary tiers, as shown in FIG. 1.

Cooling water enters the lower octagonal shaped support member 25, as indicated by the arrow 111, and flows via the hoses 109 into the lower headers 65. From the headers 65, the cooling water flows upwardly in the rectangular tubular conduits 59 into the upper header 63. Thence, the cooling fluid flows via the hoses 109 into the lower headers 65 of the intermediary tier and upwardly in the tubular conduits 59 to the upper headers. In a similar manner, the cooling fluid flows via the hoses 109 into the lower headers in the upper tier and finally emerges from the upper headers and flows via the hoses 109 into the upper octagonal shaped support member 21. The cooling fluid by this time has absorbed considerable heat from the panels and is hot. Thereafter, it flows horizontally and vertically through the tubular conduits, as shown generally by the directional arrows 113, into the outlet conduit 49, in the direction of the arrow 115.

As might be expected, the hood is provided with a lance opening (not shown) through which an oxygen lance 117, such as the one indicated schematically in FIG. 1, which may be lowered so as to enter the mouth of a basic oxygen furnace 119, also shown schematically in FIG. 1. Conveniently an oxygen lance apparatus such as illustrated in Patent 3,119,889 may be used.

The hood support structure 13 also conveniently supports auxiliary equipment such as the flux chutes 121, 123, shown in FIGS. 1, 2 and 3. The flux chutes 121, 123, are each provided with a pivotable lower portion 125, which is also water cooled, and which is hinged at 127, as shown in FIG. 1. The water cooled pivoted chute portions may be conveniently operated by a piston and cylinder arrangement 129, which is operable preferably from a remote location. Necessarily, a portion of the water cooled panels 57 of the lower tier are omitted where the pivoted chute portions are installed.

In the present invention, the upper end of the hood 11 is connected to the inlet end of an exhaust fan duct 131 by means of a conventional type expansion joint 133. Thus, the effluent may be carried immediately from the hood 11 to other off-gas treating apparatus. It will be appreciated by those skilled in the art, that the space 107 separating adjacent panels in a tier, and separating adjacent tiers, is provided for the purpose of accommodating the panels when they have expanded due to heat. Also, such space admits some ambient air into the hood which has a cooling effect on the effluent. In any particular installation or application, the clearance space 107, of course, may be varied to suit the particular conditions.

The foregoing has presented a novel panel type hood. It is both simple and inexpensive to manufacture. The panels are readily accessible for repairs and maintenance. The present hood is also light in weight and there is improved cooling fluid circulation; both features contributing to greater efficiency and economy in operation.

We claim:

1. A hood for a basic oxygen type furnace comprising:
   (a) a frame structure disposed relative to said furnace including a plurality of spaced apart fluid conductive tubular members;
   (b) a plurality of closed-ended rectangular hollow members disposed in side-abutting relation forming a panel structure;
   (c) fluid inlet and outlet tubular headers disposed adjacent opposite ends of each panel comprising said panel structure;
   (d) fluid conduit means communicating said headers to the adjacent panel whereby fluid entering said inlet header courses the hollow members of such panel and flows therefrom via said outlet header;
   (e) a plurality of said panels substantially fixed to said frame structure and spaced apart laterally to form an open-ended conduit for the effluent from said furnace;
   (f) conduit means fluidly connecting said headers to said tubular frame; and
   (g) means for injecting cooling fluid into said tubular frame structure whereby cooling fluid flows thence into each inlet header and courses each panel structure and said fluid flows from each panel via said outlet header whereby said effluent conduit is cooled.

2. A hood for a metal refining type furnace comprising:
   (a) a fluid conductive tubular frame structure supporting a plurality of fluid conductive panels;
   (b) said panels being arranged in spaced apart laterally adjacent relation forming an open-ended conduit for the effluent from said furnace; and
   (c) means to flow cooling fluid in said tubular frame; and
   (d) means to conduct cooling fluid from said frame into said panels whereby both said frame and said panels are cooled;
   (e) and wherein the means for fixing each said panels to said frame allows said panel to move freely when said panel is heated;
   (f) and wherein said panels are comprised each of a plurality of rectangular hollow closed-ended members;
   (g) and wherein said frame is movable relative to said furnace.

3. The invention set forth in claim 2 wherein:
   (a) said frame is mounted on wheels for movement of said hood relative to said furnace.

4. Apparatus for conducting gaseous effluent from a basic oxygen type furnace comprising:
   (a) a first octagonal shaped tubular conduit;
   (b) a second octagonal shaped tubular conduit disposed in axial relation to said first octagonal shaped conduit and maintained in spaced apart relation from said first conduit by a plurality of tubular members intercommunicating said first and second conduits forming thereby a fluid conductive tubular support structure;
   (c) a plurality of closed-ended rectangular tubular members maintained in said abutting relation forming a panel section having a plurality of linear fluid passages therewithin;
   (d) inlet and outlet tubular headers fixed to said panel and communicating with said passages;
   (e) a plurality of said panels disposed in spaced apart substantially parallel axial side adjacent relation, with each panel being mounted for free movement when heated to said support structure and with said panels forming an open-ended conduit for said effluent; and
   (f) fluid conduit means communicating said headers and said tubular support structure whereby cooling fluid coursing the first octagonal tubular conduit flows into said inlet headers and courses the linear fluid passages in said panels and flows out of said panels via said outlet header into said second octagonal tubular conduit thereby cooling said effluent conduit.

5. The invention set forth in claim 4 wherein:
   (a) said tubular support structure is adapted for movement of the effluent conduit relative to said furnace.

6. Apparatus for conducting gaseous effluent from a furnace for refining molten metal comprising:
   (a) a conduit defining an effluent passageway open at one end adjacent said furnace to receive the effluent therefrom and opened at the other end for discharging said effluent therefrom;
   (b) said conduit having an axis of symmetry and including a plurality of adjacent separate groups of fluid conductive panels disposed at different levels above said furnace, the panels of each group being arranged about said axis and comprising a portion of the envelope of said conduit, each panel of a group having fluid inlet and fluid outlet conduits, with the outlet conduits of one group of panels fluidly communicating with the inlet conduits of the panels of an adjacent group at a higher level; and
   (c) a fluid conductive frame supporting said groups of panels and fluidly comunicating with the inlet conduits of the panels at the lowest level and with the outlet conduits of the panels at the highest level, whereby fluid coursing in said frame also flows into and out of said panels and thereby cools said conduits.

7. The invention set forth in claim 6 wherein:
(a) said support frame and conduit are movably mounted relative to said furnace.

References Cited

UNITED STATES PATENTS

| | | | |
|---|---|---|---|
| 2,752,410 | 6/1956 | Olsson | 266—31 X |
| 2,847,206 | 8/1958 | McFeaters | 266—35 |
| 2,855,194 | 10/1958 | Konig | 266—35 |
| 2,940,733 | 6/1960 | Umbricht. | |
| 2,964,304 | 12/1960 | Rice | 266—31 X |
| 3,138,649 | 6/1964 | Erni | 266—31 X |
| 3,154,406 | 10/1964 | Allard | 266—35 X |
| 3,170,017 | 2/1965 | Namy | 266—15 X |
| 3,173,980 | 3/1965 | Hysinger | 266—15 X |
| 3,197,186 | 7/1965 | Mirigay | 266—31 X |
| 3,224,841 | 12/1965 | Kemmetmuller | 266—31 X |

JOHN F. CAMPBELL, *Primary Examiner.*

R. F. DROPKIN, *Assistant Examiner.*